(12) United States Patent
Turanyi et al.

(10) Patent No.: US 9,294,401 B2
(45) Date of Patent: Mar. 22, 2016

(54) METHOD AND APPARATUS FOR DATA TRANSFER IN A PEER-TO-PEER NETWORK

(75) Inventors: Zoltan R Turanyi, Szentendre (HU); Attila Mihály, Dunakeszi (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1449 days.

(21) Appl. No.: 12/666,843

(22) PCT Filed: Jun. 28, 2007

(86) PCT No.: PCT/EP2007/056515
§ 371 (c)(1),
(2), (4) Date: May 12, 2010

(87) PCT Pub. No.: WO2009/000331
PCT Pub. Date: Dec. 31, 2008

(65) Prior Publication Data
US 2010/0250733 A1     Sep. 30, 2010

(51) Int. Cl.
*H04L 12/801*    (2013.01)
*H04L 29/08*    (2006.01)
*H04L 12/927*    (2013.01)
*H04L 12/54*    (2013.01)
*H04L 12/851*    (2013.01)
*H04L 12/931*    (2013.01)
*H04N 21/2385*    (2011.01)
*H04N 21/24*    (2011.01)

(52) U.S. Cl.
CPC ............. *H04L 47/10* (2013.01); *H04L 67/104* (2013.01); *H04L 67/322* (2013.01); *H04L 12/5695* (2013.01); *H04L 47/2441* (2013.01); *H04L 47/805* (2013.01); *H04L 49/205* (2013.01); *H04N 21/2385* (2013.01); *H04N 21/2402* (2013.01)

(58) Field of Classification Search
USPC ........... 709/220, 235, 224–226; 370/328, 338
See application file for complete search history.

(56) References Cited

U.S. PATENT DOCUMENTS

| | | | |
|---|---|---|---|
| 6,430,154 B1 * | 8/2002 | Hunt ................... | H04L 12/5693 370/230.1 |
| 6,782,428 B1 * | 8/2004 | Gleeson ................. | H04L 47/10 370/395.21 |
| 7,023,843 B2 * | 4/2006 | Ruutu ................. | H04L 12/5693 370/230.1 |

(Continued)

FOREIGN PATENT DOCUMENTS

| WO | 02/03623 A1 | 1/2002 |
|---|---|---|
| WO | 2006/125454 A1 | 11/2006 |

OTHER PUBLICATIONS

Nicholas, K et al., Definition of the Differentiated Services Field (DS Field) in the IPv4 and IPv6 Headers, Dec. 1998, RFC 2474, pp. 1-19.*

(Continued)

*Primary Examiner* — Backhean Tiv
(74) *Attorney, Agent, or Firm* — Coats & Bennett, PLLC

(57) ABSTRACT

A method is provided of managing traffic in a network. The method comprises applying (S5) an indication to a packet being sent through the network, the indication being selected in dependence upon a level of traffic determined (S3) for a subscriber associated with the packet and representing a per-hop behaviour to be applied subsequently to the packet. The indication is applied so as to manage at least to some extent traffic associated with the subscriber.

24 Claims, 4 Drawing Sheets

(56) References Cited

U.S. PATENT DOCUMENTS

| | | | | |
|---|---|---|---|---|
| 7,151,776 | B1* | 12/2006 | Iyer | H04L 69/161 370/335 |
| 7,215,637 | B1* | 5/2007 | Ferguson | H04L 45/00 370/230.1 |
| 7,523,041 | B2* | 4/2009 | Chen | G06Q 30/0601 705/1.1 |
| 7,574,179 | B2* | 8/2009 | Barak | H04L 5/0023 340/539.1 |
| 7,586,899 | B1* | 9/2009 | Mohaban | H04L 29/06027 370/352 |
| 7,639,654 | B2* | 12/2009 | Riazi | H04W 88/16 370/338 |
| 7,684,320 | B1* | 3/2010 | Nucci | H04L 43/022 370/229 |
| 7,688,727 | B1* | 3/2010 | Ferguson | H04L 49/3009 370/230.1 |
| 7,738,382 | B2* | 6/2010 | Le Faucheur | H04L 47/10 370/235.1 |
| 7,746,781 | B1* | 6/2010 | Xiang | H04L 47/2408 370/235 |
| 7,843,938 | B1* | 11/2010 | Sutter | H04L 41/5003 370/395.21 |
| 8,107,821 | B2* | 1/2012 | El-Ahmadi | H04J 3/1652 398/128 |
| 8,189,597 | B2* | 5/2012 | Fan | H04L 12/5602 370/230 |
| 8,249,057 | B1* | 8/2012 | Mohaban | H04L 29/06027 370/352 |
| 8,554,860 | B1* | 10/2013 | Cook | H04L 47/12 709/207 |
| 2002/0054169 | A1* | 5/2002 | Richardson | H04L 41/0893 715/854 |
| 2002/0064149 | A1* | 5/2002 | Elliott | H04L 12/14 370/352 |
| 2003/0152084 | A1* | 8/2003 | Lee | G06F 9/3885 370/395.21 |
| 2003/0189900 | A1* | 10/2003 | Barany | H04L 1/0014 370/229 |
| 2003/0208621 | A1 | 11/2003 | Bowman | |
| 2003/0214954 | A1* | 11/2003 | Oldak | H04L 47/10 370/400 |
| 2004/0213224 | A1* | 10/2004 | Goudreau | H04L 29/06 370/389 |
| 2005/0052992 | A1* | 3/2005 | Cloonan | H04L 12/5695 370/229 |
| 2005/0066026 | A1* | 3/2005 | Chen | G06Q 30/0601 709/224 |
| 2005/0114541 | A1* | 5/2005 | Ghetie | H04L 47/10 709/232 |
| 2005/0138149 | A1* | 6/2005 | Bhatia | H04L 12/28 709/220 |
| 2005/0160180 | A1 | 7/2005 | Rabje et al. | |
| 2005/0226216 | A1 | 10/2005 | Oyama et al. | |
| 2006/0146807 | A1* | 7/2006 | Codaccioni | H04W 28/16 370/356 |
| 2006/0179048 | A1* | 8/2006 | Doumuki | H04L 12/2805 |
| 2006/0227706 | A1* | 10/2006 | Burst | H04L 12/5695 370/229 |
| 2007/0192507 | A1* | 8/2007 | DiBiasio | H04L 12/5695 709/238 |
| 2007/0195762 | A1* | 8/2007 | Choi | H04L 47/10 370/389 |
| 2007/0244811 | A1* | 10/2007 | Tumminaro | G06Q 20/10 705/39 |
| 2007/0250399 | A1* | 10/2007 | Dudley | G06Q 10/00 705/26.1 |
| 2007/0253438 | A1* | 11/2007 | Curry | H04L 47/10 370/412 |
| 2008/0025301 | A1* | 1/2008 | Lenzini | H04L 12/5693 370/389 |
| 2008/0159152 | A1* | 7/2008 | Ben-Shalom | H04L 41/5022 370/242 |
| 2008/0291827 | A1* | 11/2008 | Xiong | H04L 45/00 370/230.1 |
| 2008/0291916 | A1* | 11/2008 | Xiong | H04L 45/00 370/392 |
| 2008/0310417 | A1* | 12/2008 | Friskney | H04L 12/4645 370/392 |
| 2009/0185527 | A1* | 7/2009 | Akhtar | H04W 28/12 370/329 |
| 2010/0250733 | A1* | 9/2010 | Turanyi | H04L 47/10 709/224 |
| 2010/0278045 | A1* | 11/2010 | Xiang | H04L 47/2408 370/235 |

OTHER PUBLICATIONS

Heinanen, J et al., Assured Forwarding PHB Group, Jun. 1999, RFC 2597, pp. 1-11.*
Blake, S et al., An Architecture of Differentiated Services, Dec. 1998, RFC 2475, pp. 1-34.*
Black D et al., Per Hop Behavior Indification Codes, Jun. 2001, RFC 3140, pp. 1-8.*
Davie, B et al., An Expedited Forwarding PHB(Per-Hop Behavior), Mar. 2002, RFC 3246, pp. 1-15.*
Technical Specification MEF 2 Requirement and Framework for Ethernet Service Protection in Metro Ethernet Networks, Feb. 8, 2004, Metro Ethernet Forum, pp. 1-41.*

* cited by examiner

FIG. 4

| Bandwidth Profile Result | | Bandwidth Profile Compliance | Service Frame Disposition |
|---|---|---|---|
| Ingress Bandwidth Profile | Egress Bandwidth Profile | | |
| Red | Red | Red | Discard |
| Red | Yellow | | |
| Red | Green | | |
| Red | Not Applied | | |
| Yellow | Red | | |
| Green | Red | | |
| Not Applied | Red | | |
| Yellow | Yellow | Yellow | Deliver to the egress UNI according to the Service Attributes of the service instance but SLS performance objectives do not apply. |
| Yellow | Green | | |
| Yellow | Not Applied | | |
| Green | Yellow | | |
| Not Applied | Yellow | | |
| Green | Green | Green | Deliver to the egress UNI according to the Service Attributes of the service instance and SLS performance objectives apply. |
| Green | Not Applied | | |
| Not Applied | Green | | |
| | | | |
| Not Applied | Not Applied | Not Applicable | Deliver to the egress UNI according to the Service Attributes of the service instance and SLS performance objectives apply. |

METHOD AND APPARATUS FOR DATA TRANSFER IN A PEER-TO-PEER NETWORK

BACKGROUND OF THE INVENTION

1. Field of the Invention

The present invention relates to a method and apparatus for use in a network. The present invention relates particular, but not exclusively, to residential and business broadband internet access provided by service providers.

2. Description of the Related Art

Internet access is typically provided as a relatively simple service, relying on flat rate billing model, i.e., subscribers are allowed to send or receive a limited or unlimited amount of traffic for a fixed monthly fee. In return, subscribers are provided with a best-effort (BE) service, i.e., there are no bandwidth guarantees. Generally, only a maximum access bandwidth is specified in the Service Level Agreement (SLA). This maximum bandwidth is enforced by the Internet Service Providers (ISPs) by applying policy setting at their edge devices handling subscriber sessions, for example Digital Subscriber Line Access Multiplexer (DSLAM) and Broadband Remote Access Server (BRAS).

Transport provisioning of the service providers takes into account the differences in subscriber behaviour like activity, volume of traffic generated etc. That is, it applies an oversubscription to its transport resources. The amount of oversubscription applied is usually expressed in terms of contention ratios. The term contention ratio applies specifically to the number of people connected to an ISP who share a set amount of bandwidth. This may differ depending on the aggregation level of the network where it is applied. Example values would be 50:1, for home users (that is to say that 50 people or lines will vie for the same bandwidth) and 20:1 for business users.

The most common Internet application contributing to excessive usage on the Internet is file-sharing. This is also known as peer-to-peer. These are programs that allow other users on the Internet to access files located on your computer. Some of the more common file-sharing programs are BitTorrent, KaZaa, Gnutella, eDonkey, eMule, fasttracks and Morpheus, some or all of which may be trademarks, registered or otherwise, of their respective owners.

Peer-to-peer traffic now accounts for between 65 and 80 percent of the world's service provider traffic. The traffic is mostly generated by so-called "power-users", who generally represent a small percentage of the total number of subscribers. Managing the peer-to-peer traffic generated by power users is a significant issue for operators. The available bandwidth per user decreases in case many subscribers uses file-sharing applications. This will manifest in poor overall broadband service and in increased costs due to increased helpdesk calls, subscriber turnover, and high peering costs for international traffic. When most of the peer-to-peer content resides outside of their network boundaries, ISPs quickly find themselves losing money when their subscribers download content across international lines.

ISPs have recognized this problem and taken measures for controlling peer-to-peer traffic. This is done by traffic classification and protocol-discovery features that can determine the mix of traffic on the network, which is important in isolating congestion problems.

A known example is a network based application recognition technique, which can identify application/protocols from layer 4 to layer 7 based on packet header information and also deep packet inspection. The applications that network based application recognition can classify include applications that use the following:

Statically assigned (well-known) TCP and UDP port numbers

Non-UDP and non-TCP IP (Internet Protocol) protocols

Dynamically assigned TCP and UCP port numbers during connection establishment. Classification of such applications/protocols requires stateful inspection, that is, the ability to discover the data connections to be classified by parsing the control connections over which the data connection port assignments are made. Identification of the application can, e.g., be based on content signatures of the particular application.

Sub-port classification or classification based on deep inspection—that is classification by looking deeper into the packet. For example classification based on HTTP URLs, mime or host names and RTP Payload Type classification—where network based application recognition looks for the RTP Payload Type field within the RTP header amongst other criteria to identify voice and video bearer traffic.

Based on the measurements of the traffic classification tools ISPs try to ensure that network bandwidth is used efficiently by policing unwanted connections or setting bandwidth limits for them.

The present applicant has recognised and appreciated the following problems with the existing solutions available.

The above described technologies using traffic classification methods are generally not very efficient. The reason is that the file sharing applications are very flexible: they can adapt to specific situations, e.g., they can hide behind well known protocols or applications like http to cheat the firewall rules. Thus, only a modest percentage of the existing peer-to-peer traffic is recognized by these tools.

Another problem is that the traffic classification tools—especially if they use deep packet inspection—reduce the capacity of the nodes which they are installed on. Since these should be continuously modified due to new appearing applications or mutations of a given application, they cannot be implemented in hardware, so they can usually be run only on software platforms.

Utilizing traffic classification tools also increases the Operations & Maintenance (O&M) efforts considerably. Indeed, a number of O&M tasks should be performed: one has to configure the classification tools, the statistics should be regularly evaluated and the traffic filtering rules should be changed accordingly in the routers. Thus, implementing the above methods represents an increase in operating expenditure for the ISPs.

The operator measures of setting up static rules to filter out or rate limit file sharing traffic is also not very adequate for concurrently satisfying the ISPs goals to reduce customer dissatisfaction during busy hours but at the same time to achieve maximum utilization of the provisioned/rented transport resources. In principle, the filtering and rate limiting measures are needed only in case of traffic congestion; they are unnecessary in the cases of and may lead to low network performance and customer dissatisfaction and ultimately to churn.

It is desirable to address at least some of the above-identified issues.

US 2005/0174944 discloses a scheme whereby the service provider sets a bandwidth usage cap for the subscribers over a given usage period, such as a month. The usage cap is enforced by regulating the rate at which subscribers can send and receive data transmissions over an access network during the usage period. Those subscribers that send or receive data only occasionally will normally experience a transmission rate at or near the peak transmission rate offered by the service provider. However, those subscribers that attempt to send or receive excessive amounts of data will be throttled down to a lower sustained transmission rate, which will prevent them from exceeding the usage cap set by the service provider.

US 2007/0058548 and US 2006/0256718 relate to controlling the traffic entering into a network. The concepts allow setting bandwidth limits for the different flows entering into a network but are not able to dynamically control the volume of traffic based e.g., on current network load situation.

US 2005/0111368 and U.S. Pat. No. 6,910,024 disclose solutions for excessive network usage by providing differentiated pricing. These relate to dynamic charging rather than to traffic limitation. Combinations with a monitoring/traffic regulation system are also proposed in US 2005/0086062 and US 2006/0140369. Different ideas are raised, like royalty charging of copyright material transferred by peer-to-peer applications, etc. These concepts are, however, not applicable to a flat-rate pricing model.

SUMMARY OF THE INVENTION

US 2005/0226216 discloses a scheme for discriminating and controlling P2P traffic transmitted in a network.

According to a first aspect of the present invention there is provided a method of managing traffic in a network, comprising applying an indication to a packet being sent through the network, the indication being selected in dependence upon a level of traffic determined for a subscriber associated with the packet and representing a per-hop behaviour to be applied subsequently to the packet, so as thereby to manage traffic associated with the subscriber.

The method may comprise determining the level of traffic.

The method may comprise determining the level of traffic based on measurements over a predetermined time period.

The method may comprise determining the level of traffic based on a bit count of traffic associated with the subscriber.

The method may comprise determining the level of traffic at a node of the network that controls subscriber sessions.

The method may comprise applying the indication at a node of the network that controls subscriber sessions.

The method may comprise comparing the level of traffic against at least one predetermined threshold, and applying the indication in dependence thereon.

The method may comprise determining if the level of traffic is greater than a predetermined threshold, and applying the indication only if it is so determined.

The per-hop behaviour represented by the applied indication may be adapted to restrict in some way traffic associated with the subscriber, to an extent related to the determined level of traffic.

The per-hop behaviour represented by the applied indication may be adapted to allocate transport resources in such a way as to provide that subscribers associated with higher levels of traffic will experience a lower average throughput during periods of traffic congestion, compared to subscribers associated with lower levels of traffic.

The per-hop behaviour represented by the applied indication may be adapted to allow bandwidth borrowing between subscribers associated with different respective levels of traffic so as to facilitate optimal utilisation of transport resources.

The per-hop behaviour represented by the applied indication may be of a type less favourable than a Best Effort per-hop behaviour.

The method may comprise applying the per-hop behaviour.

The per-hop behaviour may be applied in at least one node by another operator under a Service Level Agreement, SLA.

The SLA may require the other operator not to change the applied indication, and/or to apply a per-hop behaviour appropriate to the applied indication, at least for packets associated with subscribers having a level of traffic above a predetermined threshold.

The method may comprise specifying those packets as 'yellow', according to the SLA attribute specification on the User-Network Interface under standardization by the Metro Ethernet Forum.

The applied indication may be a penalty indication.

The method may comprise applying the indication to a packet en route through the network.

The method may comprise applying the indication to the packet to replace an existing such indication.

The indication may comprise a Differentiated Services Code Point.

At least one subscriber may comprise a group of subscribers. In this way, traffic level management may be conducted on the basis of a group or class of subscribers, instead of on the basis of individual subscribers.

Traffic may be managed under a flat-rate pricing model.

The network may comprise a broadband Internet network.

The network may comprise a mobile broadband network.

According to a second aspect of the present invention there is provided an apparatus for managing traffic in a network, comprising means for applying an indication to a packet being sent through the network, the indication being selected in dependence upon a level of traffic determined for a subscriber associated with the packet and representing a per-hop behaviour to be applied subsequently to the packet, so as thereby to manage traffic associated with the subscriber.

According to a third aspect of the present invention there is provided a program for controlling an apparatus to perform a method according to the first aspect of the present invention, or which, when run on an apparatus, causes the apparatus to become apparatus according to the second aspect of the present invention.

The program may be carried on a carrier medium.

The carrier medium may be a storage medium.

The carrier medium may be a transmission medium.

According to a fourth aspect of the present invention there is provided an apparatus programmed by a program according to the third aspect of the present invention.

According to a fifth aspect of the present invention there is provided a storage medium containing a program according to the third aspect of the present invention.

BRIEF DESCRIPTION OF THE DRAWINGS

FIG. 4 is a table showing Metro Ethernet Forum prescription for disposition of the different (in- and out-of-profile) frames.

DETAILED DESCRIPTION OF THE PREFERRED EMBODIMENTS

A relatively light-weight and low-cost architecture is proposed for an embodiment of the present invention, one which enables the operators better to handle the above-described problems represented by power users, and improve the performance of their network.

In an embodiment of the present invention, simple periodic bit-count measurements can be made to determine levels of traffic associated with different respective subscribers. In doing so, the power users can be identified. Such measurements can be performed in the nodes controlling the subscriber sessions.

Based on the determined levels of traffic, an indication is applied to packets being transported in the network, the indication representing a Per-Hop Behaviour (PHB) to be applied subsequently to those packets, for example in a transport function. In one embodiment, each such indication is a Differentiated Services Code Point (DSCP), with the traffic of power users being remarked (or reassigned) to a new DSCP, referred to in the following as the "penalty-DSCP". (Further information on Differentiated Services can be found in IETF RFC 2474, RFC 2475, RFC 2597, RFC 3140 and RFC 3246.)

The transport functions themselves are provisioned to handle the Per-Hop Behaviour represented by the penalty DSCP, and this cooperation with the remarking functions enables traffic associated with power users to be managed at least to some extent.

The penalty PHB is characterized by the fact that packets within this PHB have higher drop priority in case of congestion than those in the BE PHB. The penalty PHB may offer similar or worse properties from the delay perspective as the BE PHB, depending on the operator choice. From a provisioning perspective, the latter case could be realized e.g., by scheduling the "penalty" and BE aggregate in different queues, and dividing the transport resources between the BE and "penalty" traffic in such a way that guarantees that in case of congestion the power users will experience a lower average throughput.

Figure 1:
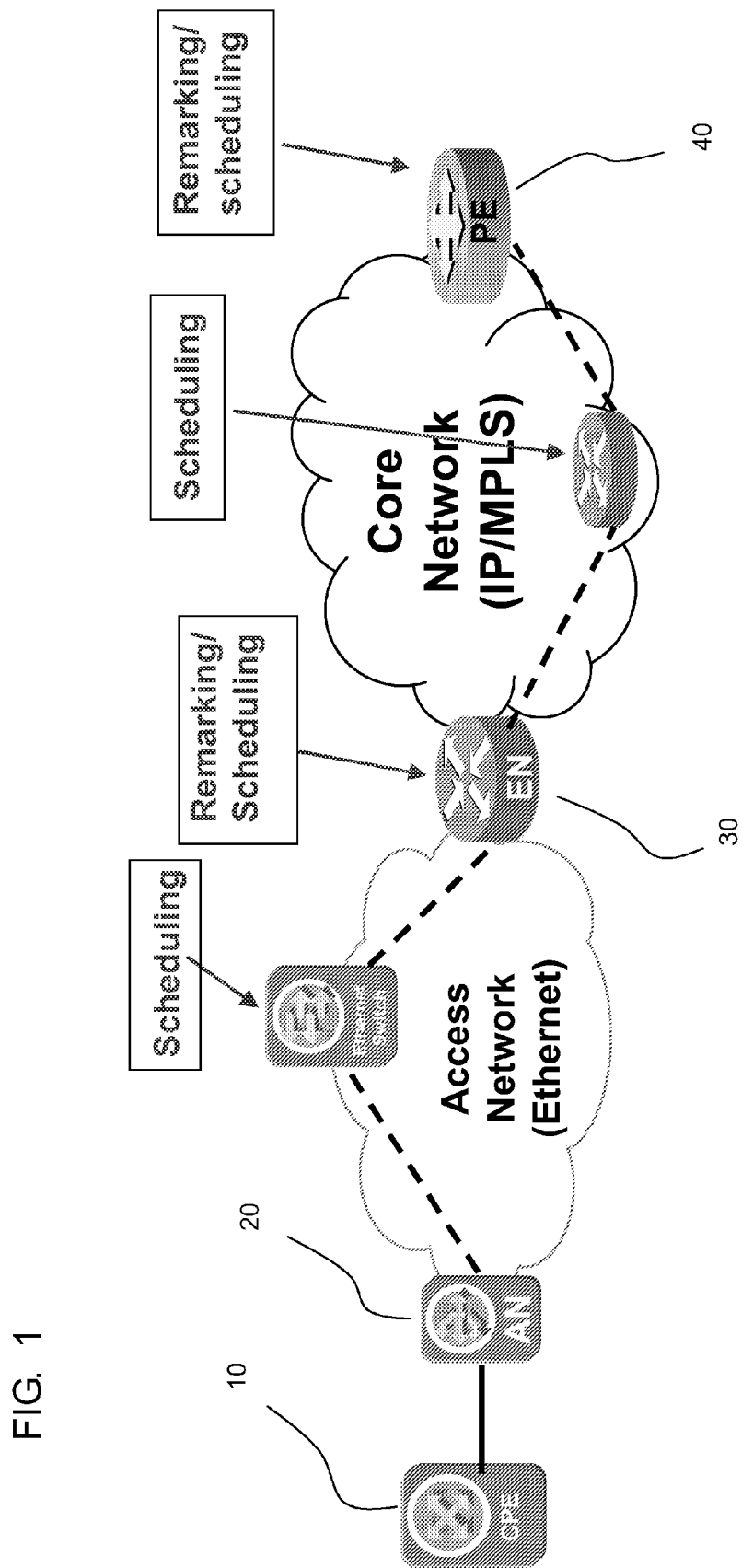
FIG. 1 illustrates functions embodying the present invention in the context of an operator network for broadband services including internet access.

FIG. 1 shows a reference operator network (ISP network) for broadband services including internet access. The main components are briefly explained below. The text shown in rectangular boxes represents the new functions to be implemented in the various nodes according to an embodiment of the present invention.

A customer-premises equipment or customer-provided equipment (CPE) device 10 connects the home network to the service provider network.

An Access Node (AN) 20 is the Layer-2 demarcation point between the customer and ISP network. There is a separate physical medium going to the subscriber CPE device 10, and the AN 20 (e.g., DSLAM) maintains per-service channels and scheduling towards a CPE. Thus, it is assumed that there is enough bandwidth between the CPE 10 and AN 20 for each subscriber's maximum bandwidth.

An Edge Node (EN) 30 is a node terminating the access network and shall always be placed between the access network and the backbone network (or between the access network and the service provider network in case there is no separate backbone network). The architecture supports multiple edges; those edge nodes can terminate different type of traffic. These edge nodes can be a BRAS, edge router, session border gateway (SBG) etc.:

A BRAS is a router and is an IP aggregation point for the subscriber traffic. It comprises various session-related functionality, such as PPP termination, dynamic subscriber interfaces using DHCP, as well as session-based QoS and hierarchical scheduling, and accounting. It is an injection point for policy management and IP QoS in the access network. It also provides aggregation capabilities (e.g. IP, PPP, Ethernet, MPLS) between the access network and the NSP or ASP.

An edge router is an IP aggregation node for the customer traffic that does not need volume or time-based accounting or billing (e.g. handle in middleware for IPTV). It provides aggregation capabilities (IP, MPLS or Ethernet) between the access network and the NSP or ASP; it is also an injection point for policy management and IP QoS for aggregated services in the access network.

A Session Border Gateway (SBG) is also known as "session controller" and is a network element that controls and anchors both signaling and media across network domains and borders, performing the peering functions required for real time communications. The SBG provides critical control and security functions for optimal voice, video and multimedia sessions.

A WiMAX ASN is an edge node specified by WiMAX Forum. It performs WiMAX Radio Resource Management, and QoS policy mapping to the WiMAX radio link and access network. It also supports mobility.

The Provider Edge (PE) 40 is a node terminating the operator's backbone and is placed at the border between the operator's network and the service provider's network or other operators' networks. It is generally an edge router.

The different functions proposed for the different entities are shown in rectangular boxes and by arrows in FIG. 1. In the nodes dynamically controlling and configuring the subscriber sessions, a remarking function is proposed. Such nodes may be the EN 30, but also the PE 40, for example. The remarking function is adapted to remark the packets to a "penalty" DSCP codepoint. Actual remarking is preceded by a filtering function that selects the traffic of the power-users to be remarked. The filtering rules (i.e., the IP addresses to be filtered) are configured by a policy control function that categorizes the subscribers based on the volume of generated traffic. It is preferable that the traffic volume is measured as a long-term average (e.g., sent/received bytes in the past 20 days) using e.g., the sliding window method, but other methods are possible.

It will be appreciated that an embodiment of the present invention is not limited to a single "penalty" DSCP. Instead, multiple levels of penalties may exist, with the user being increasingly penalized the more she/he transmits. Penalization also results in less traffic (by its nature), which results in less and less penalty and consequently more traffic for insistent users. Multiple levels of penalty help to overcome this "oscillation" problem by finding a stable working point. However, for ease of explanation, in the rest of the description a single penalty level is assumed; the skilled person can readily apply the teaching to multiple penalty levels.

Figure 2:
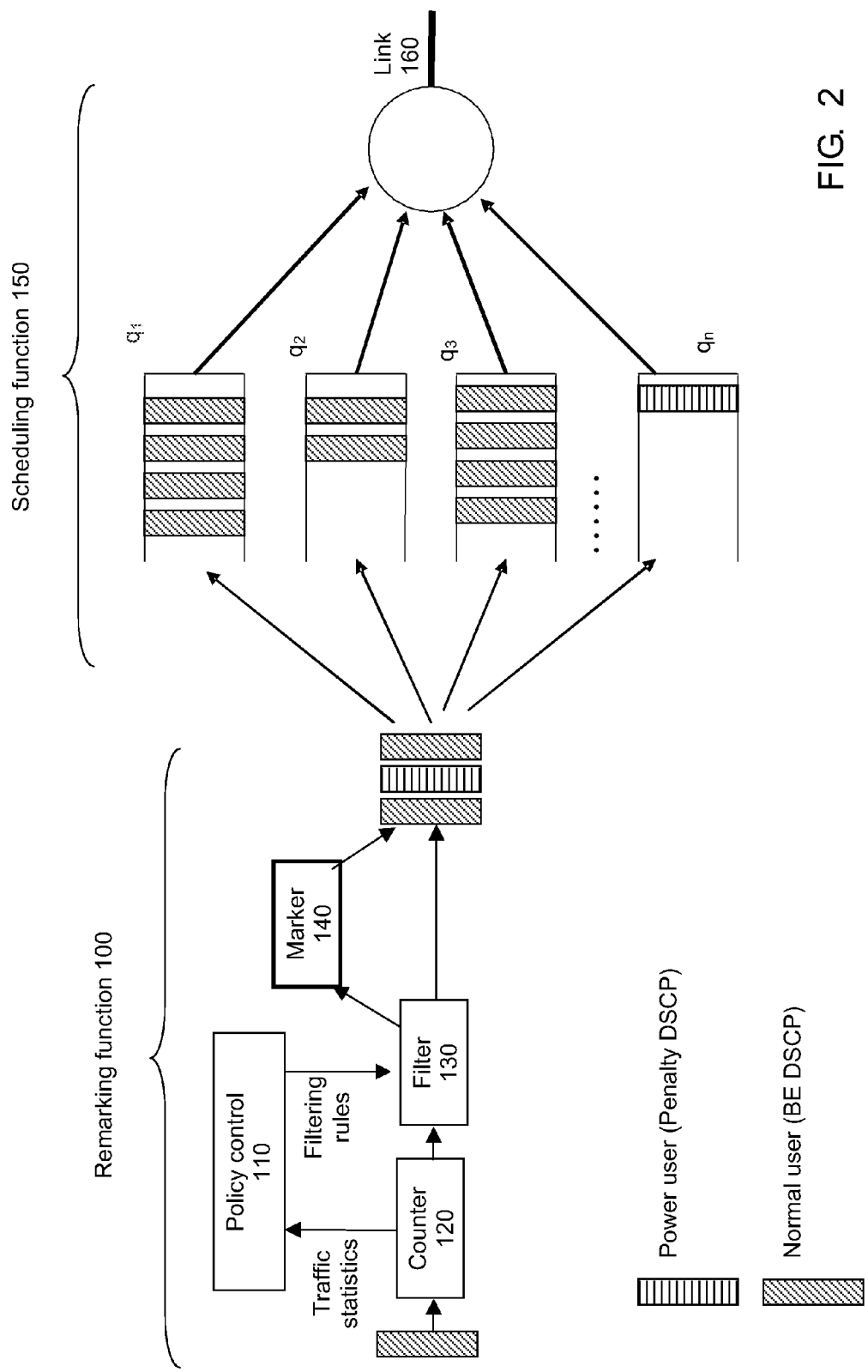
FIG. 2 shows an architecture embodying the present invention.

An architecture according to an embodiment of the present invention is shown schematically in FIG. 2. FIG. 2 shows the architecture as having a remarking (filtering/remarking) function 100 before a scheduling (queuing) function 150. The remarking function 100 is adapted to select and remark the traffic of power users, while the scheduling function 150 is adapted to provide a separate queue and settings for handling the "penalty DSCP".

Figure 3:
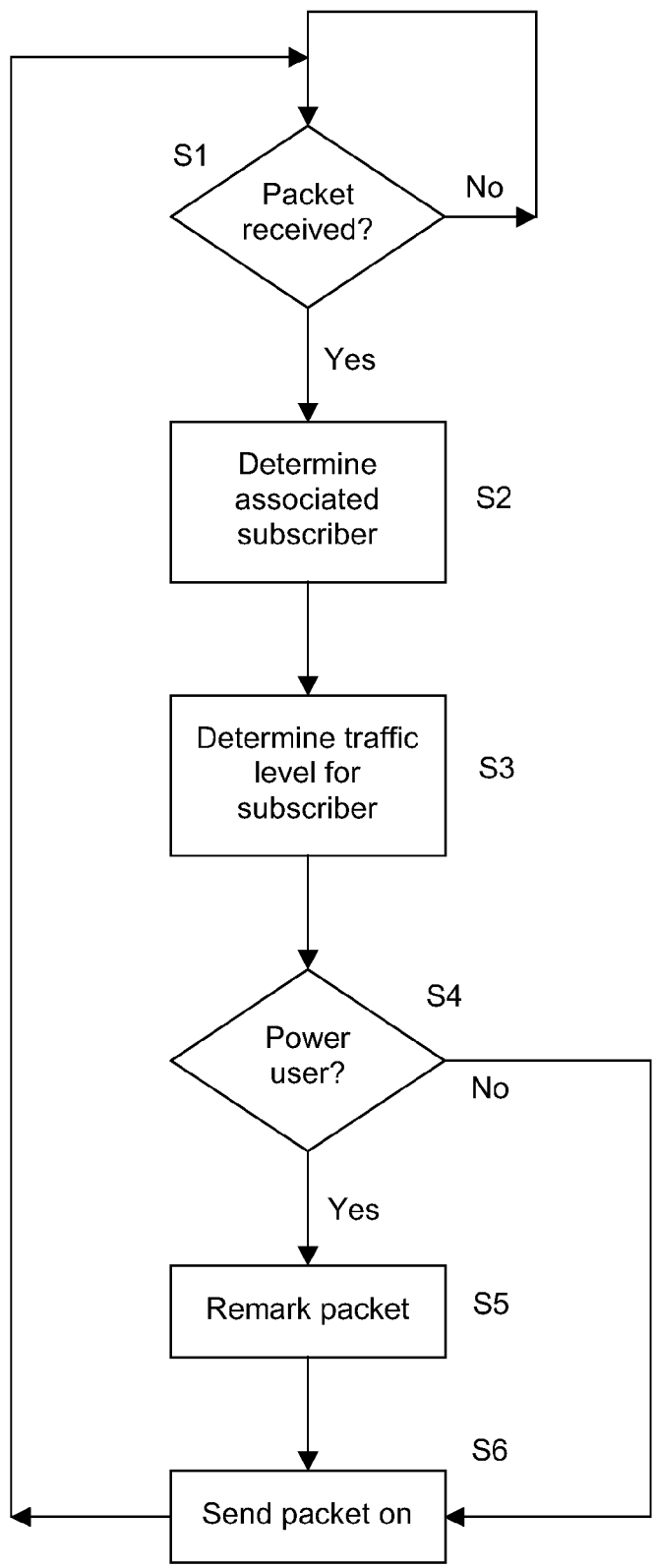
FIG. 3 is a flowchart illustrating a method according to an embodiment of the present invention.

The method steps performed by the remarking function 100 are illustrated in the flowchart of FIG. 3. In step S1 the remarking function 100 waits to receive a packet from the network, remaining on step S1 if no packet is received and moving to step S2 if a packet is received. In step S2, the subscriber associated with the packet received in step S1 is determined. In step S3, the traffic level associated with that subscriber is determined. In step S4, the traffic level associated with the subscriber is categorised in some way, in this example by determining whether or not the traffic level characterises the subscriber as a power user. If the subscriber is determined in step S4 to be a power user, the packet is applied, in step S5, with a penalty indication (it is remarked), and passed on to the next network node or function in step S6 so that an appropriate PHB can later be applied to the packet based on the penalty indication. If the subscriber is determined in step S4 not to be a power user, step S5 is skipped, with processing passing direct to step S6.

To enable these steps to be performed, the remarking function 100 comprises a policy control function 110, a counting function 120, a filtering function 130 and a marking function 140. The counting function 120 measures traffic levels associated with the various subscribers, for example according to a time-average bit count method. The filtering function 130 filters out traffic determined to be associated with power users, and sends that traffic to the remarking function 140. The filtering is performed with reference to a policy managed by the policy control function 110, based on traffic level information the policy control function 110 receives from the counting function 120.

The scheduling function 150 manages traffic in this embodiment by dividing it into different queues $q_1$ to $q_n$, with each queue potentially being managed according to different queuing policies before being placed on the output link 160. For example, traffic marked with the penalty DSCP is sent to queue $q_n$, where the penalty PHB is applied (this is described in further detail below).

The scheduling function 150 depicted in FIG. 2 is also proposed for the various transport elements along the AN-PE path as shown in FIG. 1. A scheduling function 150 need not be provided together with a remarking function 100 in the same node; instead, a scheduling function 150 in one node of the network can be provided to handle traffic that has passed through a remarking function 100 in another node of the network.

The information about power users conveyed in the penalty DSCP is mapped to the corresponding L2 QoS information for L2 elements (e.g., to proper P-bits in case of Ethernet switches) to have differentiated treatment also on the L2 access.

The operator can set its own policy on the penalty applied on the power users' traffic by configuring the queue parameters, e.g., priority and weight. Generally, it is useful to use a scheduling method that allows bandwidth borrowing between the power-users' traffic and normal best-effort traffic in order to guarantee optimal utilization of the operator's own transport resources and relative satisfaction also for the power users for periods with low activity. In addition, at the inter-domain peering points with ISPs the operator can apply separate shapers for the power users' traffic in order to control the peering cost caused by these users.

The network in FIG. 1 can be considered to represent a case when the ISP owns also the transport. However, it will be appreciated that the proposed concept can be applied also in other cases, when the transport is owned by another operator. Examples of such cases are The wholesale network model, where the access network towards a customer is owned by another operator (usually a PTT operator) that redirects the subscriber traffic to the ISP NE using a Layer-2 Tunneling Protocol (L2TP) or other Virtual Private Network (VPN) technology Other rented L2 or L3 connections in the ISPs aggregation or core network, e.g., Metro-Ethernet EVC (Ethernet Virtual Connection) or IP/MPLS VPN.

Since it is generally the transport network that experiences congestion, it is desirable to convey the information about 'power-users' also to the transport provider. This implies some changes into the inter-operator SLAs.

Generally, inter-operator SLAs contain one or two set of bandwidth profile parameters and prescription for the traffic below and above a certain profile. For example, the SLA attribute specification on the User-Network Interface (UNI) under standardization by Metro Ethernet Forum (MEF) [MEF10, Ethernet Service Attributes phase 2 (Approved draft 6) 27 Jul. 2006] includes the following bandwidth profile parameters:

Committed Information Rate (CIR) expressed as bits per second. CIR MUST be ≥0.

Committed Burst Size (CBS) expressed as bytes. When CIR>0, CBS MUST be greater than or equal to the largest Maximum Transmission Unit size among all of the EVCs that the Bandwidth Profile applies to.

Excess Information Rate (EIR) expressed as bits per second. EIR MUST be ≥0

Excess Burst Size (EBS) expressed as bytes. When EIR>0, EBS MUST be greater than or equal to the largest Maximum Transmission Unit size among all of the EVCs that the Bandwidth Profile applies to.

MEF also proposes a method for disposition of the frames on the UNI (see the table in FIG. 4 [source: MEF10, Ethernet Service Attributes phase 2 (Approved draft 6) 27 Jul. 2006], which shows MEF prescription for disposition of the different in- and out-of-profile frames):

The frames, which are within the CIR and CBS limits are forwarded and served according to the QoS parameters (delay, jitter, loss ratio, etc.) specified in the SLA. (green frames)

The frames, which are within the EIR and EBS limits may be forwarded, however these frames are marked and they have no QoS guarantees. (yellow frames)

The frames, which are out of the EIR and EBS limits are discarded. (red frames)

One solution for the transport provider to take into consideration and properly handle the traffic of 'power-users' is that the packets/frames of those users should be set as 'yellow' already by the ISP, and the SLA should specify that these packets are not remarked by the transport provider and they should be counted and handled as yellow packets. In this way it is guaranteed that the traffic of power-users is preempted and dropped in case of congestion.

In summary, an embodiment of the present invention provides a solution to the power-user problem by handling traffic on a per-subscriber basis instead of per-application. This is more suitable to regulate the traffic of power users since it gives no possibility for the applications to avoid traffic regulating rules by hiding under other protocols (the subscriber can always be identified by the network based on the assigned IP address).

The solution also eliminates the issue of low network utilization in cases of lower user activity. Indeed, if there are abundant network resources then the traffic of power users will also pass unharmed even if remarked to another DSCP.

The proposed concept allows the differentiated treatment to be effective also in cases with rented transport resources through proper inter-operator cooperation (SLAs).

The proposed solution requires low O&M effort: there is no need to continuously monitor the traffic with expensive tools that may reduce the capacity of the nodes they are installed on. Also, the traffic classification/filtering/forwarding rules to be configured are much simpler with the proposed method.

It will be appreciated that the proposed method is not restricted to fixed internet services; other networks applying the flat-rate service model may also implement it to handle power users in their network. One such candidate is the mobile broadband services. In mobile networks the radio interface guarantees a fair sharing of resources between the different terminals for the BE traffic in case of radio resource bottleneck, but applying an embodiment of the present invention one can extend this also to the Radio Access Network (RAN) and core transport.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

What is claimed is:

1. A method of managing data traffic in a communications network, the method comprising:
   selecting, by a processing circuit of an edge node in the communications network, a penalty indicator in dependence upon a level of traffic determined for a subscriber associated with a packet being sent through the communications network, the penalty indicator comprising a services-differentiation indicator and representing a per-hop behavior to be applied subsequently to the packet associated with the subscriber, and wherein the per-hop behavior represented by the applied penalty indicator is adapted to allow bandwidth borrowing between subscribers associated with different respective levels of traffic; and
   applying, by the processing circuit, the penalty indicator to the packet so as to thereby manage traffic associated with the subscriber.

2. The method of claim 1, further comprising the processing circuit determining the level of traffic.

3. The method of claim 2, wherein determining the level of traffic comprises the processing circuit determining the level of traffic based on measurements over a predetermined time period.

4. The method of claim 2, wherein determining the level of traffic comprises the processing circuit determining the level of traffic based on a bit count of traffic associated with the subscriber.

5. The method of claim 2, wherein the processing circuit that determines the level of traffic is at a node of the communications network that controls subscriber sessions.

6. The method of claim 1, wherein the processing circuit that applies the penalty indicator is at a node of the communications network that controls subscriber sessions.

7. The method of claim 1, comprising comparing, by the processing circuit, the level of traffic against at least one predetermined threshold, and applying the penalty indicator in dependence thereon.

8. The method of claim 1, comprising determining, by the processing circuit, if the level of traffic is greater than a predetermined threshold, and applying the penalty indicator only if it is so determined.

9. The method of claim 1, wherein the per-hop behavior represented by the applied penalty indicator is adapted to restrict traffic associated with the subscriber, to an extent related to the determined level of traffic.

10. The method of claim 1, wherein the per-hop behavior represented by the applied penalty indicator is adapted to allocate transport resources so as to provide that subscribers associated with higher levels of traffic will experience a lower average throughput during periods of traffic congestion, compared to subscribers associated with lower levels of traffic.

11. The method of claim 1, wherein the per-hop behavior represented by the applied penalty indicator is of a type less favorable than a Best Effort per-hop behavior.

12. The method of claim 1, further comprising applying, by the processing circuit, the per-hop behavior.

13. The method of claim 1, wherein the per-hop behavior is applied in at least one node by another operator under a Service Level Agreement (SLA).

14. The method of claim 13, wherein the SLA requires the other operator not to change the applied penalty indicator, or to apply a per-hop behavior appropriate to the applied penalty indicator, or both, at least for packets associated with subscribers having a level of traffic above a predetermined threshold.

15. The method of claim 14, comprising specifying packets associated with subscribers having a level of traffic above a predetermined threshold as Metro Ethernet Forum (MEF) User Network Interface (UNI) SLA attribute yellow.

16. The method of claim 1, further comprising the processing circuit applying the penalty indicator to a packet en route through the network.

17. The method of claim 1, further comprising the processing circuit applying the penalty indicator to the packet to replace an existing such indication.

18. The method of claim 1, wherein the services-differentiation indicator comprises a Differentiated Services Code Point.

19. The method of claim 1, wherein the subscriber comprises a group of subscribers.

20. The method of claim 1, wherein traffic is managed under a flat-rate pricing model.

21. The method of claim 1, wherein the network comprises a broadband Internet network.

22. The method of claim 1, wherein the network comprises a mobile broadband network.

23. An edge node in a communications network for managing data traffic in the network, the edge node comprising:
   a communications circuit configured to communicate data with other nodes in the network; and
   a processing circuit configured to execute a remarking function to:
      select a penalty indicator in dependence upon a level of traffic determined for a subscriber associated with a packet being sent through the network, the penalty indicator comprising a services-differentiation indicator and representing a per-hop behavior to be applied subsequently to the packet, and wherein the per-hop behavior represented by the applied penalty indicator is adapted to allow bandwidth borrowing between subscribers associated with different respective levels of traffic; and
      apply the penalty indicator to the packet.

24. A non-transitory computer-readable storage medium comprising computer program instructions stored thereon that, when executed by a processing circuit of an edge node in a communications network, configures the edge node to:
   select a penalty indicator in dependence upon a level of traffic determined for a subscriber associated with a packet being sent through the network, the penalty indicator comprising a services-differentiation indicator and representing a per-hop behavior to be applied subsequently to the packet, and wherein the per-hop behavior represented by the applied penalty indicator is adapted to allow bandwidth borrowing between subscribers associated with different respective levels of traffic; and apply the penalty indicator to the packet so as to thereby manage traffic associated with the subscriber.

\* \* \* \* \*